US009837951B2

(12) United States Patent
Tsui

(10) Patent No.: US 9,837,951 B2
(45) Date of Patent: Dec. 5, 2017

(54) MOTOR APPARATUS AND MOTOR CONTROL METHOD

(71) Applicant: Kinpo Electronics, Inc., New Taipei (TW)

(72) Inventor: Chuan-Chia Tsui, New Taipei (TW)

(73) Assignee: Kinpo Electronics, Inc., New Taipei (TW)

( * ) Notice: Subject to any disclaimer, the term of this patent is extended or adjusted under 35 U.S.C. 154(b) by 0 days.

(21) Appl. No.: 15/191,541

(22) Filed: Jun. 24, 2016

(65) Prior Publication Data

US 2017/0324365 A1    Nov. 9, 2017

(30) Foreign Application Priority Data

May 4, 2016    (TW) .............................. 105113782 A

(51) Int. Cl.
| | |
|---|---|
| G05B 9/02 | (2006.01) |
| G05B 5/00 | (2006.01) |
| H02P 29/40 | (2016.01) |
| H02P 3/02 | (2006.01) |
| H02P 29/02 | (2016.01) |
| G05B 19/416 | (2006.01) |

(52) U.S. Cl.
CPC .............. *H02P 29/40* (2016.02); *H02P 3/025* (2013.01); *H02P 29/02* (2013.01); *G05B 19/416* (2013.01)

(58) Field of Classification Search
None
See application file for complete search history.

(56) References Cited

U.S. PATENT DOCUMENTS

| | | | | |
|---|---|---|---|---|
| 4,999,557 A | * | 3/1991 | Inoue ...................... | H02P 23/16 318/609 |
| 5,485,065 A | * | 1/1996 | Kaneko ................ | G05B 19/416 318/270 |

(Continued)

FOREIGN PATENT DOCUMENTS

| | | |
|---|---|---|
| JP | 5174997 | 4/2013 |
| TW | 201202878 | 1/2012 |

(Continued)

OTHER PUBLICATIONS

"Office Action of Taiwan Counterpart Application", dated Jan. 4, 2017, p. 1-p. 7.

*Primary Examiner* — Bentsu Ro
*Assistant Examiner* — Zemenay Truneh
(74) *Attorney, Agent, or Firm* — JCIPRNET

(57) ABSTRACT

A motor apparatus and a motor control method are provided. The method includes the following steps. An actual speed and an actual current of a motor module are sensed by a sensor module. An adjusted speed is kept at a set speed or a speed curve by a speed adjusting circuit. A control signal is provided by a feedback control circuit according to a difference between the adjusted speed and the actual speed. The control signal is converted to a current to drive the motor module, such that the actual speed is kept at the adjusted speed. When the actual speed is decreased and the actual current is increased to a limited current value, a setting parameter of the feedback controller is changed according to the limited current value, such that the control signal enters a saturation state and the actual current is kept at the limited current value.

22 Claims, 8 Drawing Sheets

(56) References Cited

U.S. PATENT DOCUMENTS

| | | | | |
|---|---|---|---|---|
| 8,928,267 B2* | 1/2015 | Igarashi | ............... | G05B 19/416 318/469 |
| 2007/0040529 A1* | 2/2007 | Takebayashi | .......... | G05B 19/40 318/685 |
| 2014/0062380 A1* | 3/2014 | Yoo | ..................... | H02P 21/0017 318/766 |
| 2015/0107556 A1* | 4/2015 | Johansson | ............. | B60W 10/06 123/350 |

FOREIGN PATENT DOCUMENTS

| | | |
|---|---|---|
| TW | 201217928 | 5/2012 |
| TW | 201310888 | 3/2013 |
| TW | 201517499 | 5/2015 |

\* cited by examiner

MOTOR APPARATUS AND MOTOR CONTROL METHOD

CROSS-REFERENCE TO RELATED APPLICATION

This application claims the priority benefit of Taiwan application serial no. 105113782, filed on May 4, 2016. The entirety of the above-mentioned patent application is hereby incorporated by reference herein and made a part of this specification.

BACKGROUND

Technical Field

The disclosure relates to a motor control technique, and particularly relates to a motor apparatus and a motor control method with a plurality of control modes.

Description of Related Art

In general, a servo motor usually has the characteristics of being position (angle)-controllable, speed-controllable, and current (torque force)-controllable. However, in the conventional techniques of servo motor control, only one of the position (angle), speed, and current (torque force) can be controlled, and it is unable to control at least two of the position (angle), speed, and current (torque force) together.

For example, when the servo motor is operating and encounters an obstacle, making the operating speed of the servo motor decreased, it is common to increase the current (torque force) of the servo motor to keep the operating speed of the servo motor at the speed set by the user. However, increasing the current of the servo motor may result in over-current, such that the servo motor may thus have to be shut down to avoid damages. Under such circumstance, the servo motor needs to be turned on again. Besides, under such circumstance, even if increasing the current of the servo motor does not result in over-current, it is still dangerous to increase the current (torque force) of the servo motor when the servo motor encounters an obstacle (e.g., when the servo motor hits a human being).

SUMMARY

The disclosure provides a motor apparatus and a motor control method capable of controlling at least two of a position (angle), speed, and current (torque force) of a motor module of the motor apparatus together to increase safety of the motor apparatus in use.

A motor method according to an embodiment of the disclosure includes steps as follows. An actual speed and an actual angle of a motor module are sensed by a sensor module. A speed curve is computed based on the actual angle, a set angle, and a set speed by a speed computation circuit. An adjusted speed is maintained on the speed curve by a speed adjusting circuit. Whether to change the adjusted speed is determined by the speed adjusting circuit when the actual speed is changed as the motor module responds to an event, such that the adjusted speed follows the actual speed. A control signal is computed based on a speed difference between the adjusted speed and the actual speed by a feedback control circuit. The control signal is converted into a current by a current control circuit to drive the motor module, thereby maintaining the actual speed at the adjusted speed. When the event ends, the adjusted speed and the actual speed are again maintained on the speed curve by the speed adjusting circuit.

According to an embodiment of the disclosure, the control method further includes the following. An actual current of the motor module is sensed by the sensor module. At least one setting parameter of the feedback control circuit is changed by the feedback control circuit based on a limited current value when the actual speed is decreased and the actual current is increased to the limited current value as the motor module responds to the event, such that the control signal enters a saturation state to maintain the actual current at the limited current value.

A motor method according to an embodiment of the disclosure includes steps as follows. An actual speed and an actual current of a motor module are sensed by a sensor module. An adjusted speed is maintained at a set speed or on a speed curve by a speed adjusting circuit. A control signal is computed based on a speed difference between the adjusted speed and the actual speed by a feedback control circuit. The control signal is converted into a current by a current control circuit to drive the motor module, thereby maintaining the actual speed at the adjusted speed. At least one setting parameter of the feedback control circuit is changed by the feedback control circuit based on a limited current value when the actual speed is decreased and the actual current is increased to the limited current value as the motor module responds to an event, such that the control signal enters a saturation state to maintain the actual current at the limited current value.

According to an embodiment of the disclosure, the control method further includes the following. The adjusted speed is changed by the speed adjusting circuit to follow the actual speed when the control signal enters the saturation state to maintain the actual current at the limited current value, such that the control signal exits the saturation state to decrease the actual current.

A motor apparatus according to an embodiment of the disclosure includes a motor module, a sensor module, a speed computation circuit, a speed adjusting circuit, a feedback control circuit, and a current control circuit. The sensor module is configured to sense an actual speed and an actual angle of the motor module. The speed computation circuit is coupled to the sensor module and configured to compute a speed curve based on the actual angle, a set angle, and a set speed. The speed adjusting circuit is coupled to the speed computation circuit to receive the speed curve, and configured to maintain an adjusted speed on the speed curve. The feedback control circuit is coupled to the speed adjusting circuit and the sensor module, and configured to generate a control signal based on a speed difference between the adjusted speed and the actual speed. The current control circuit is coupled to the feedback control circuit and the motor module, and configured to convert the control signal into a current to drive the motor module, such that the actual speed is maintained at the adjusted speed. The speed adjusting circuit determines whether to change the adjusted speed when the actual speed is changed as the motor module responds to an event, such that the adjusted speed follows the actual speed. When the event ends, the speed adjusting circuit maintains the adjusted speed and the actual speed on the speed curve again.

According to an embodiment of the disclosure, in the motor apparatus, the sensor module is further configured to sense an actual current of the motor module. The feedback control circuit changes at least one setting parameter of the feedback control circuit based on a limited current value when the actual speed is decreased and the actual current is increased to the limited current value as the motor module responds to an event, such that the control signal enters a saturation state to maintain the actual current at the limited current value.

According to an embodiment of the disclosure, the feedback control circuit serves as a proportion-integration-differentiation controller, and the at least one setting parameter includes a proportion gain parameter, an integration gain parameter, and a differentiation gain parameter.

A motor apparatus according to an embodiment of the disclosure includes a motor module, a sensor module, a speed adjusting circuit, a feedback control circuit, and a current control circuit. The sensor module is configured to sense an actual speed and an actual current of the motor module. The speed adjusting circuit is configured to maintain an adjusted speed at a set speed or on a speed curve. The feedback control circuit is coupled to the speed adjusting circuit and the sensor module, and configured to generate a control signal based on a speed difference between the adjusted speed and the actual speed. The current control circuit is coupled to the feedback control circuit and the motor module, and configured to convert the control signal into a current to drive the motor module, such that the actual speed is maintained at the adjusted speed. The feedback control circuit changes at least one setting parameter of the feedback control circuit based on a limited current value when the actual speed is decreased and the actual current is increased to the limited current value as the motor module responds to an event, such that the control signal enters a saturation state to maintain the actual current at the limited current value.

According to an embodiment of the disclosure, the speed adjusting circuit changes the adjusted speed to follow the actual speed when the control signal enters the saturation state to maintain the actual current at the limited current value, such that the control signal exits the saturation state to decrease the actual current.

Based on the above, in the motor apparatus and the motor control method according to the disclosure, at least two of the position (angle), speed, and current (torque force) of the motor module are able to be controlled together. In this way, when the motor apparatus is applied with an external force or encounters an obstacle (e.g., the motor hits a human being), the current (torque force) of the motor module may be prevented from being excessively high, which causes damages or danger, so as to ensure the safety of the motor apparatus in use. Once the external force of the obstacle is removed, the actual speed of the motor module may return to the set speed to operate normally.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
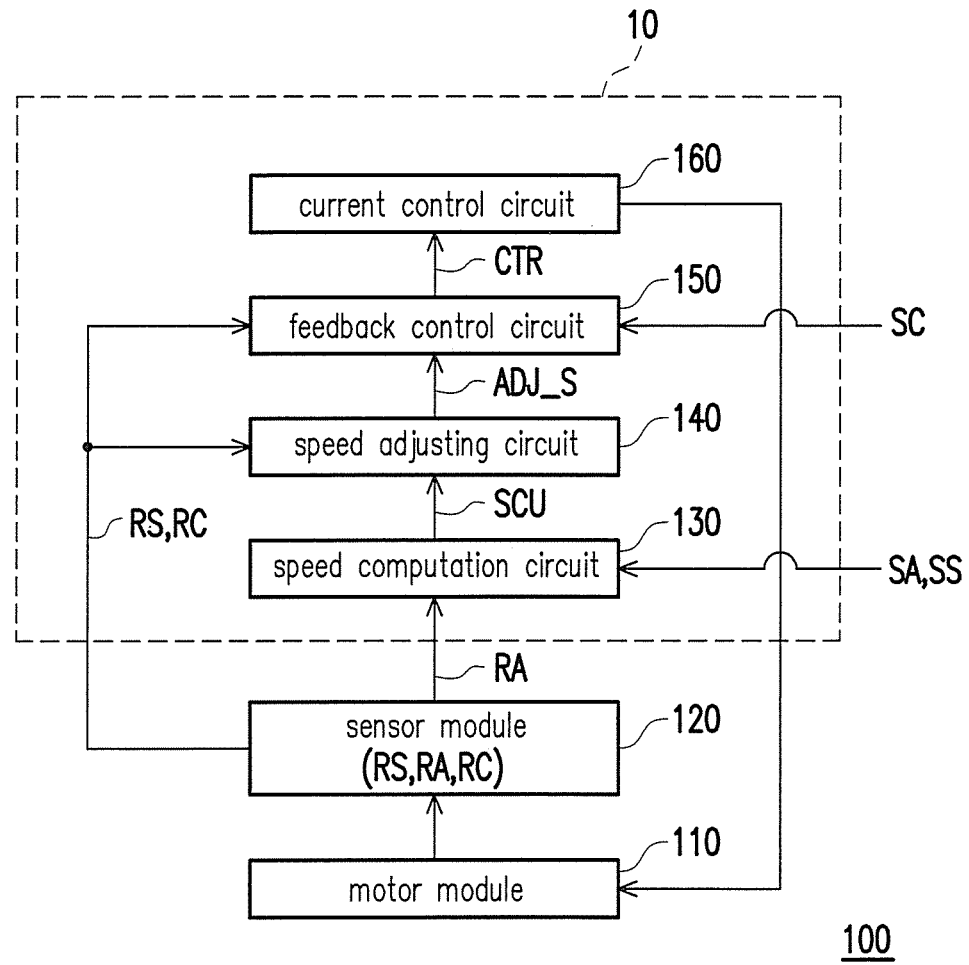
FIG. 1 is a schematic circuit block view illustrating a motor apparatus according to an embodiment of the disclosure.

Descriptions of the disclosure are given with reference to the exemplary embodiments illustrated with accompanied drawings, wherein same or similar parts are denoted with same reference numerals. In addition, whenever possible, identical or similar reference numbers stand for identical or similar elements in the figures and the embodiments.

Referring to FIG. 1, FIG. 1 is a schematic circuit block view illustrating a motor apparatus 100 according to an embodiment of the disclosure. The motor apparatus 100 may include a motor module 110, a sensor module 120, and a processing circuit 10. In an embodiment of the disclosure, the sensor module 120 may include a speed sensor, a position sensor, or a current sensor, and the motor module 110 may be a servo motor module. However, the disclosure is not limited thereto.

In an embodiment of the disclosure, the processing circuit 10 may be hardware, firmware, or software or machine-executable programming codes stored in a memory and loaded and executed by a micro-processor, a micro-controller, or a digital signal processor. If implemented as hardware, the processing circuit 10 may be implemented as a single integrated circuit chip, or implemented as a plurality of circuit chips. It shall be understood that the disclosure does not intend to impose a limitation in this regard. The circuit chips or the single integrated circuit chip may be implemented by adopting application specific integrated circuit(s) (ASIC) or field programmable gate array(s) (FPGA). The memory may be a random access memory, read only memory, flash memory, hard drive, or optical disc, for example.

In an embodiment of the disclosure, as shown in FIG. 1, the processing circuit 10 may include a speed computation circuit 130, a speed adjusting circuit 140, a feedback control circuit 150, and a current control circuit 160. However, the disclosure is not limited thereto. The speed computation circuit 130, the speed adjusting circuit 140, the feedback control circuit 150, and the current control circuit 160 may be respectively implemented as a circuit chip, firmware, or software. In an embodiment of the disclosure, the processing circuit 10 may be configured to exert control on at least two of angle (position), speed, and current (torque force) of the motor module 110. In the following, respective control methods (control modes) for the motor apparatus 100 are described in the following.

In an embodiment of the disclosure, the angle and the speed of the motor module 110 may be controlled together.

Figure 2:
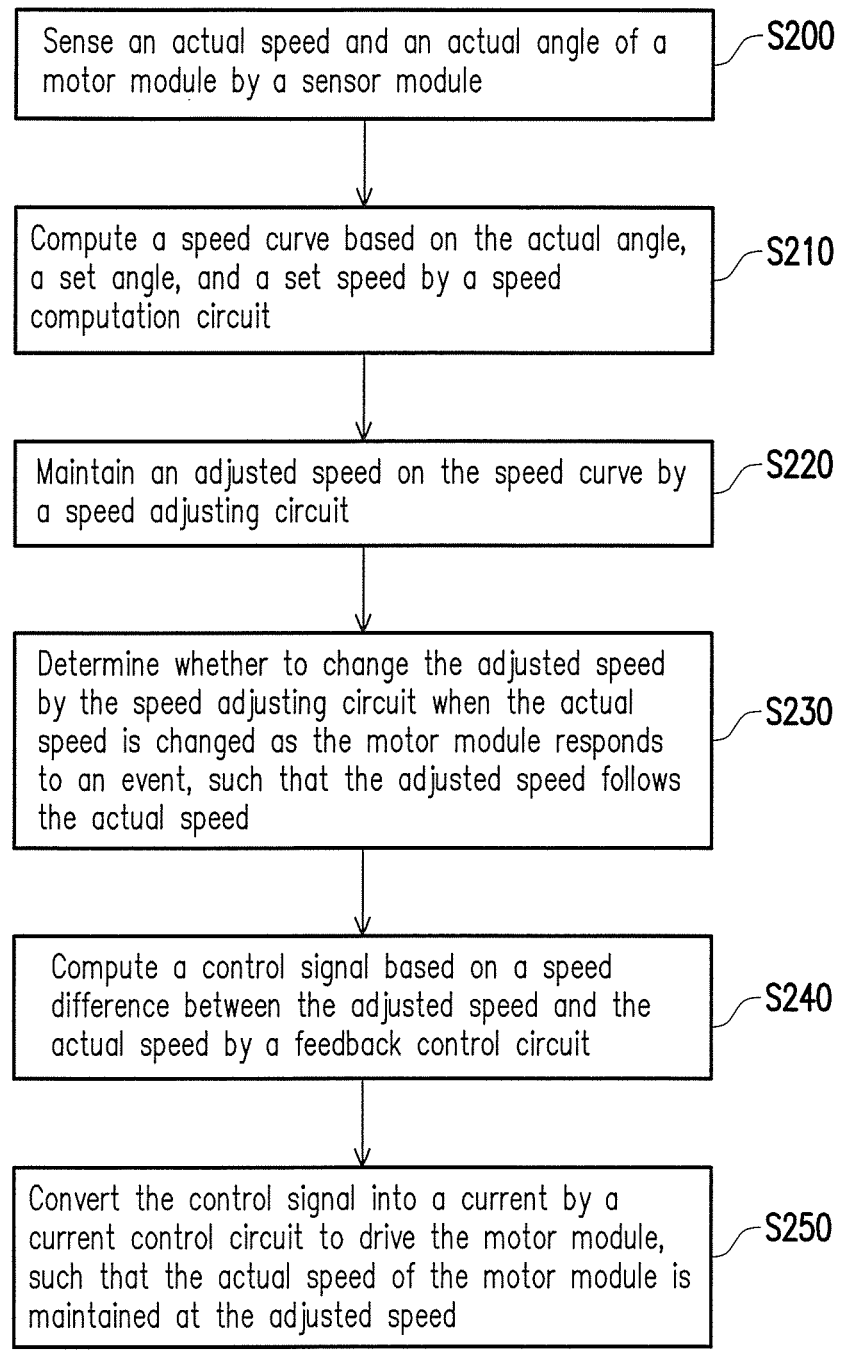
FIG. 2 is a flowchart illustrating a motor control method according to an embodiment of the disclosure.

Referring to FIGS. 1 and 2, FIG. 2 is a flowchart illustrating a motor control method according to an embodiment of the disclosure. According to the motor control method as shown in FIG. 2, the angle and the speed of the motor module 110 of FIG. 1 are controlled together. First of all, at Step S200, an actual speed RS and an actual angle RA of the motor module 110 are sensed by the sensor module 120.

Figure 3:
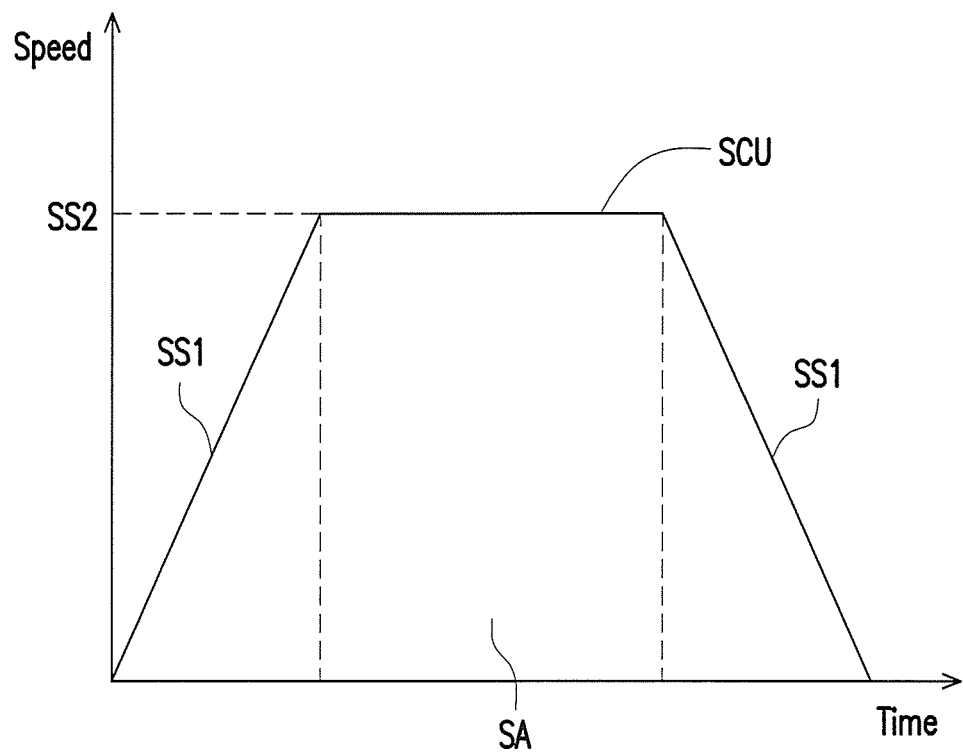
FIG. 3 is a schematic view illustrating a speed curve according to an embodiment of the disclosure.

Then, at Step S210, a speed curve SCU may be computed based on the actual angle RA, a set angle SA, and a set speed SS by the speed computation circuit 130 (processing circuit 10). The set angle SA and the set speed SS may be an angle command and a speed command input by the user. However, the disclosure is not limited thereto. Specifically, the set speed SS may include an acceleration SS1 and a speed limitation SS2 of the motor module 110. As shown in FIG. 3, the speed curve SCU may be a trapezoidal curve on a coordinate system (e.g., in a speed/time coordinate system). In addition, a maximum speed of the speed curve SCU is the speed limitation SS2, and a rising slope or a descending slope of the speed curve SCU is the acceleration SS1. In addition, an area surrounded by the speed curve SCU and the coordinate system is the set angle SA.

More specifically, in an embodiment of the disclosure, the speed curve SCU may be obtained based on Equation (1), wherein a is the acceleration SS1, S is an angle difference between the set angle SA and the actual angle RA.

$$V=\sqrt{2aS} \quad \text{Formula (1)}$$

Referring to FIGS. 1 and 2 again, at Step S220, an adjusted speed ADJ_S may be maintained on the speed curve SCU by the speed adjusting circuit 140 (processing circuit 10). Then, at Step S230, if the actual speed RS is changed as the motor module 110 responds to an event, whether to change the adjusted speed ADJ_S may be determined by the speed adjusting circuit 140. In this way, the adjusted speed ADJ_S may follow the actual speed RS. Then, at Step S240, the feedback control circuit 150 (the processing circuit 10) may compute a control signal CTR based on a speed difference between the adjusted speed ADJ_S and the actual speed RS. Then, at Step S250, the control signal CTR may be converted into a current by the current control circuit 160 (the processing circuit 10) to drive the motor module 110, thereby maintaining the actual speed RS of the motor module 110 at the adjusted speed ADJ_S. In particular, after the event ends, the adjusted speed ADJ_S and the actual speed RS may again be maintained on the speed curve SCU by the speed adjusting circuit 140.

Figure 4:
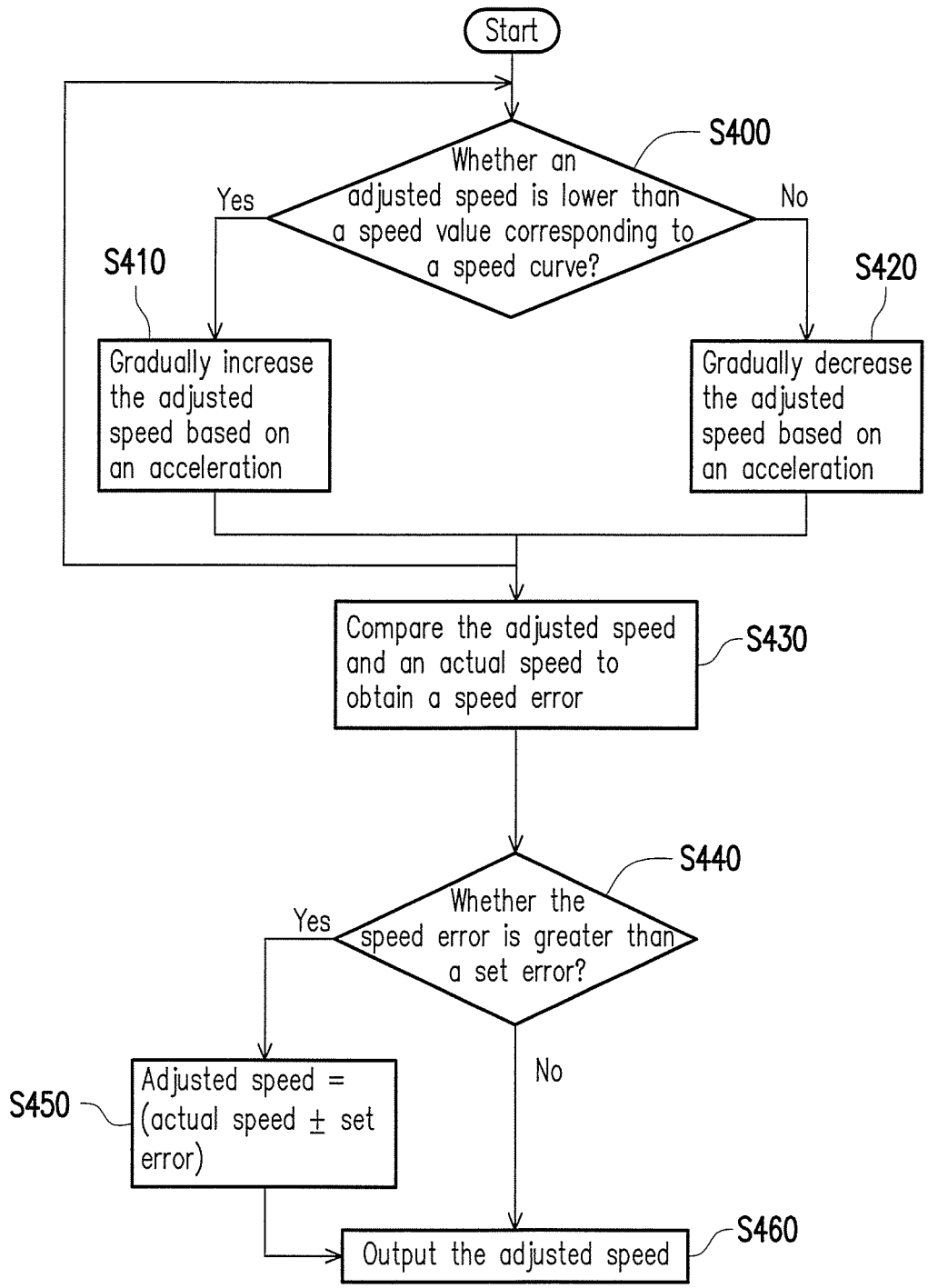
FIG. 4 is a schematic view illustrating an internal operation of a speed adjusting circuit according to an embodiment of the disclosure.
Figure 5:
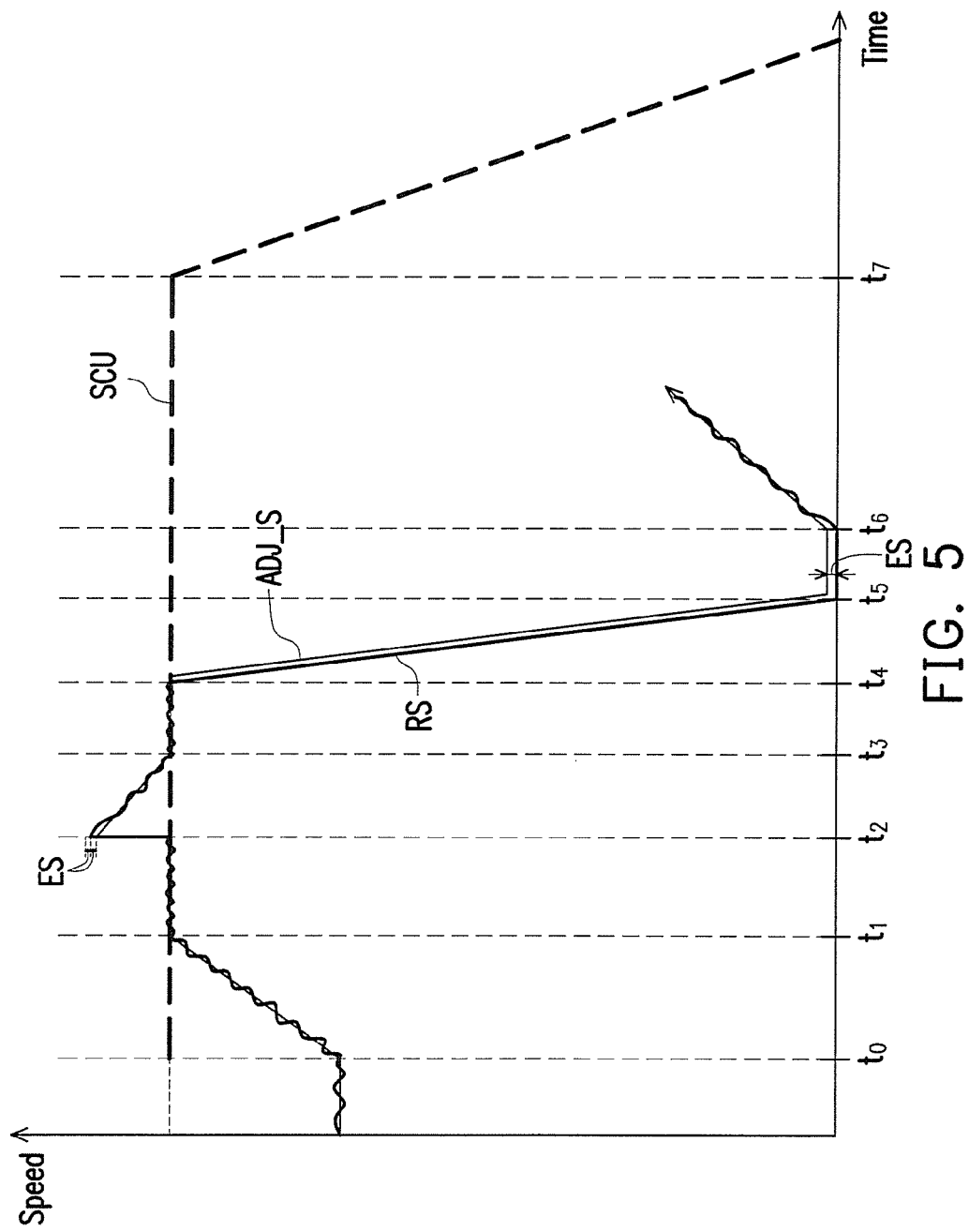
FIG. 5 is a schematic view illustrating a relation between an adjusted speed, an actual speed, and a speed curve when angle and speed of the motor module of FIG. 1 are controlled together.

More specifically, referring to FIGS. 1, 4, and 5, FIG. 4 is a schematic view illustrating an internal operation of the speed adjusting circuit 140 according to an embodiment of the disclosure, and FIG. 5 is a schematic view illustrating a relation between the adjusted speed ADJ_S, the actual speed RS, and the speed curve SCU when the angle and speed of the motor module 110 of FIG. 1 are controlled together. As shown in FIG. 5, before a time point to, the speed adjusting circuit 140 does not obtain the speed curve SCU (or the user does not input the angle command and the speed command) yet, so the adjusted speed ADJ_S, the actual speed RS, and the speed curve SCU are unknown. At the time point t0, the speed adjusting circuit 140 obtains the speed curve SCU. At this time, the adjusted speed ADJ_S is lower than a speed value corresponding to the speed curve SCU. Thus, the speed adjusting circuit 140 may gradually increase the adjusted speed ADJ_S (i.e., accelerating, as shown in Step S400 and Step S410 in FIG. 4) based on the acceleration SS1 (as shown in FIG. 3, for example), such that the adjusted speed ADJ_S approaches the speed curve SCU from the time point t0 to a time point t1, and the adjusted speed ADJ_S is maintained on the speed curve SCU between the time point t1 and a time point t2.

It should be noted that, from the time point t0 to the time point t2 (but not including the time point t2), since a speed error between the adjusted speed ADJ_S and the actual speed RS is smaller than a set error ES (may be set by the designer based on actual use or design needs), the adjusted speed ADJ_S may be directly output to the feedback control circuit 150 (as shown in Step S430, Step S440, and Step S460 of FIG. 4) to subsequently carry out Step S240 and Step S250 shown in FIG. 2. In this way, the actual speed RS may follow the adjusted speed ADJ_S to approach and be maintained on the speed curve SCU. It should be understood that, when the actual speed RS of the motor module 110 is maintained on the speed curve SCU, the motor module 110 is operating at the set speed SS.

At the time point t2, the actual speed RS is increased due to an external force on the motor module 110. Since the speed error between the adjusted speed ADJ_S and the actual speed RS is greater than the set error ES (may be set by the designer based on actual use or design needs), an addition operation or a subtraction operation may be performed to the actual speed RS and the set error ES to obtain an updated speed. In addition, the updated speed may be used as the adjusted speed ADJ_S (as shown in Step S450 of FIG. 4), such that the adjusted speed ADJ_S follows the actual speed RS. Then, the modified adjusted speed ADJ_S may be output and provided to the feedback control circuit 150 (as shown in Step S460 of FIG. 4). In an embodiment of the disclosure, the designer may adjust the value of the set error ES so as to avoid an excessive difference between the adjusted speed ADJ_S and the actual speed RS, which may result in over-current.

From the time point t2 to a time point t3, since the adjusted speed ADJ_S is greater than the speed value corresponding to the speed curve SCU, the speed adjusting circuit 140 may gradually decrease the adjusted speed ADJ_S (i.e., decelerating, as shown in Step S400 and Step S420 in FIG. 4) based on the acceleration SS1 (as shown in FIG. 3, for example), such that the adjusted speed ADJ_S approaches the speed curve SCU from the time point t2 to the time point t3, and is maintained on the speed curve SCU between the time point t3 and a time point t4.

It should be noted that, from the time point t2 (but not including the time point t2) to the time point t4 (but not including the time point t4), since the speed error between the adjusted speed ADJ_S and the actual speed RS is smaller than the set error ES, the adjusted speed ADJ_S may be directly output to the feedback control circuit 150 (as shown in Step S430, Step S440, and Step S460 of FIG. 4) to subsequently carry out Step S240 and Step S250 shown in FIG. 2. In this way, the actual speed RS may follow the adjusted speed ADJ_S to approach and be maintained on the speed curve SCU.

Between the time point t4 and the time point t5, the actual speed RS is significantly decreased as the motor module 110 responds to an event (e.g., being applied with an external force or encountering an obstacle). Since the speed error between the adjusted speed ADJ_S and the actual speed RS is greater than the set error ES, an addition operation or a subtraction operation may be performed to the actual speed RS and the set error ES to obtain an updated speed. The updated speed may be served as the adjusted speed ADJ_S (as shown in Step S450 of FIG. 4), such that the adjusted speed ADJ_S persistently follows the actual speed RS.

Between the time point t5 and a time point t6, since the actual speed RS of the motor module 110 is reduced to zero, the adjusted speed ADJ_S may be maintained at the set error ES. In addition, the set error ES may not be zero. After the time point t6, the event that the motor module 110 encounters (e.g., being applied with an external force or encountering an obstacle) is resolved. Since the adjusted speed ADJ_S is lower than the speed value corresponding to the speed curve SCU, the speed adjusting circuit 140 may gradually increase the adjusted speed ADJ_S (i.e., accelerating, as shown in Step S400 and Step S410 as shown in FIG. 4) based on the acceleration SS1 (as shown in FIG. 3, for example), such that the adjusted speed ADJ_S approaches the speed curve SCU after the time point t6 and is eventually maintained on the curve SCU. An operation that the adjusted speed ADJ_S approaches the speed curve SCU after the time point t6 is similar to the operation between the time point t0 and the time point t1 Thus, reference is made to the operation between the time point t0 and the time point t1, and details in this regard will not be repeated in the following.

It should be noted that, when an area surrounded by a curve of the actual speed RS and the speed/time coordinate system is equal to the area surrounded by the speed curve SCU and the speed/time coordinate system, the actual angle RA of the motor module 110 reaches the set angle SA. In other words, the motor apparatus 100 at this time is moved to a position designated by the user.

Figure 6:
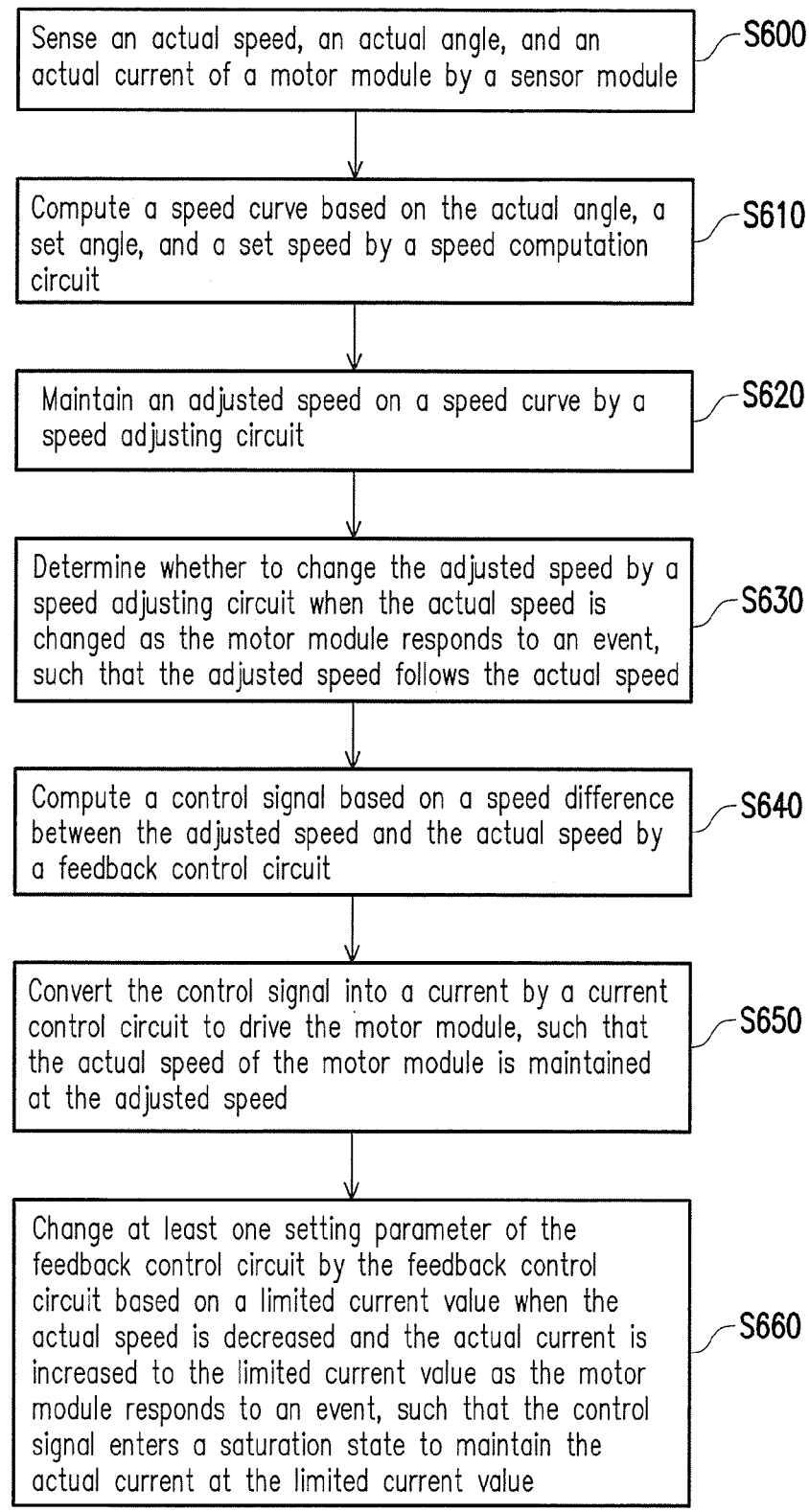
FIG. 6 is a flowchart illustrating a motor control method according to another embodiment of the disclosure.

The embodiment above describes an example where the angle and speed of the motor module 110 are controlled together. However, the disclosure is not limited thereto. In another example of the disclosure, a current of the motor module 110 may also be controlled together when the angle and speed of the motor module 110 are controlled. Referring to FIGS. 1 and 6, FIG. 6 is a flowchart illustrating a motor control method according to another embodiment of the disclosure. According to the motor control method in FIG. 6, the angle, speed, and current of the motor module 110 of FIG. 1 are controlled together.

First of all, at Step S600, the actual speed RS, the actual angle RA, and an actual current RC of the motor module 110 are sensed by the sensor module 120. Then, at Step S610, the speed curve SCU may be computed based on the actual angle RA, the set angle SA, and the set speed SS by the speed computation circuit 130 (processing circuit 10). Then, at Step S620, the adjusted speed ADJ_S may be maintained on the speed curve SCU by the speed adjusting circuit 140 (processing circuit 10). Subsequently, at Step S630, if the actual speed RS is changed as the motor module 110 responds to an event, whether to change the adjusted speed ADJ_S may be determined by the speed adjusting circuit 140. In this way, the adjusted speed ADJ_S may follow the actual speed RS. Then, at Step S640, the feedback control circuit 150 (the processing circuit 10) may compute the control signal CTR based on the speed difference between the adjusted speed ADJ_S and the actual speed RS. Then, at Step S650, the control signal CTR may be converted into a current by the current control circuit 160 (the processing circuit 10) to drive the motor module 110, thereby maintaining the actual speed RS of the motor module 110 at the adjusted speed ADJ_S. In the control method shown in FIG. 6, Step S610, Step S620, Step S630, Step S640, and Step S650, are respectively similar to Step S210, Step S220, Step S230, Step S240, and Step S250. Thus, details of these steps may be referred to relevant descriptions in FIGS. 2 to 5 and will not be repeated in the following.

At Step S660, when the actual speed RS is decreased and the actual current RS is increased to a limited current value SC as the motor module 110 responds to an event (e.g., encountering an obstacle, but the disclosure is not limited thereto), at least one setting parameter of the feedback control circuit 150 may be changed by the feedback control circuit 150 based on the limited current value SC, such that the control signal CTR enters a saturation state to maintain the actual current RC at the limited current value SC. The limited current value SC may be a current command input by the user and adapted to limit a maximum output torque force of the motor module 110. However, the disclosure is not limited thereto. In an embodiment of the disclosure, the feedback control circuit 150 may be a proportion-integration-differentiation (PID) controller, and the at least one setting parameter may include a proportion gain parameter (Kp), an integration gain parameter (Ki), and a differentiation gain parameter (Kd). However, the disclosure is not limited thereto. In another embodiment of the disclosure, the feedback control circuit 150 may also be a proportion-integration (PI) controller, a proportion-differentiation (PD) controller, a proportion (P) controller, or an integration (I) controller, and which kind of the above controllers is adopted to be the feedback control circuit 150 may be based on actual use or design needs. In yet another embodiment of the disclosure, a lead-lag controller or other types of automatic controllers may be adopted as the feedback control circuit 150.

After the event ends, the at least one setting parameter may be changed by the feedback control circuit 150, such that the control signal CTR exits the saturation state to decrease the actual current RC, and the actual speed RS is increased and maintained at the adjusted speed ADJ_S.

Figure 7:
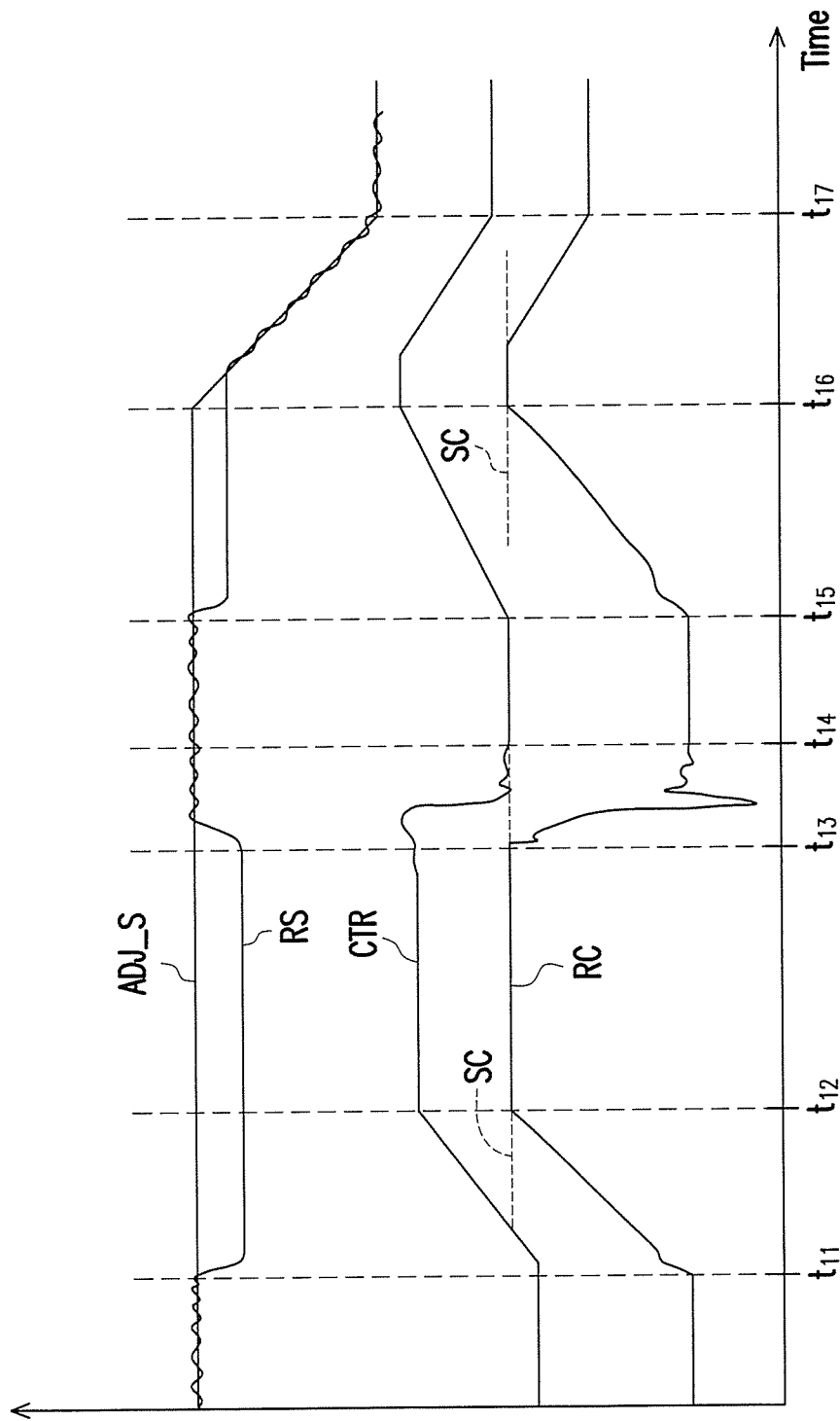
FIG. 7 is a schematic view illustrating a relation between the adjusted speed, the actual speed, a control signal, an actual current, and a limited current value when the angle, speed, and current of the motor module of FIG. 1 are controlled together.

More specifically, referring to FIGS. 1 and 7 together, FIG. 7 is a schematic view illustrating a relation between the adjusted speed ADJ_S, the actual speed RS, the control signal CS, the actual current RC, and the limited current value SC when the angle, speed, and current of the motor module 110 of FIG. 1 are controlled together. As shown in FIG. 7, before a time point t11, the actual speed RS is substantially equal to the adjusted speed ADJ_S. At this time, the motor apparatus 100 is in a stable status and moves according to the speed of the speed curve SCU.

At the time point t11, the actual speed RS is decreased as the motor module 110 responds to an event (e.g., being applied with an external force or encountering an obstacle). Here, it is assumed that the speed error between the adjusted speed ADJ_S and the actual speed RS is smaller than the set error ES. Thus, the adjusted speed ADJ_S may not be changed. At this time, in response to the speed difference between the adjusted speed ADJ_S and the actual speed RS, the control signal CTR generated by the feedback control circuit 150 starts rising, such that the actual current RC is increased.

At a time point t12, the actual current RC of the motor module 110 reaches the limited current value SC. At this time, at least one setting parameter of the feedback control circuit 150 may be changed by the feedback control circuit 150 based on the limited current value SC, such that the control signal CTR enters the saturation state to maintain the actual current RC of the motor module 110 at the limited current value SC. In this way, over-current caused by an excessively high actual current RC may be avoided, and the danger due to an excessive torque force of the motor module 110 may be avoided as well.

At a time point t13, the event (e.g., being applied with an external force or encountering an obstacle) that the motor module 110 encounters is removed. The at least one setting parameter may be changed by the feedback control circuit 150, such that the control signal CTR exits the saturation state to decrease the actual current RC, and the actual speed RS is increased (as shown in a temporal interval between the time point t13 and a time point t14) and maintained at the adjusted speed ADJ_S (as shown in a time interval between the time point t14 and a time point t15).

At the time point t15, the actual speed RS is decreased as the motor module 110 again responds to an event (e.g., being applied with an external force or encountering an obstacle). Similarly, it is assumed that the speed error between the adjusted speed ADJ_S and the actual speed RS is smaller than the set error ES. Thus, the adjusted speed ADJ_S may not be changed. At this time, in response to the speed difference between the adjusted speed ADJ_S and the actual speed RS, the control signal CTR generated by the feedback control circuit 150 starts rising, such that the actual current RC is increased.

At a time point t16, the actual current RC of the motor module 110 reaches the limited current value SC. Similarly, at least one setting parameter of the feedback control circuit 150 may be changed by the feedback control circuit 150 based on the limited current value SC, such that the control signal CTR enters the saturation state to maintain the actual current RC of the motor module 110 at the limited current value SC. In an embodiment of the disclosure, as shown at the time point t16, when the control signal CTR enters the saturation state to maintain the actual current RC at the limited current value SC, the adjusted speed ADJ_S may also be changed (decreased) by the speed adjusting circuit 140, such that the adjusted speed ADJ_S follows the actual speed RS, thereby making the control signal CTR exit the saturation state and decrease the actual current RC (i.e., decreasing the torque force of the motor module 110), as shown in a temporal interval between the time point t16 and a time point t17.

Based on the above, it can be known that when the motor module 110 is applied with an external force or encounters an obstacle, making the actual speed RS decreased and the actual current RC reach the limited current value SC, the actual current RC of the motor module 110 is maintained at the limited current value SC or starts decreasing when reaching the limited current value SC. In other words, when the motor module 110 is applied with an external force or encounters an obstacle, the output torque force of the motor module 110 may be decreased or maintained at a fixed value. In this way, over-current may be avoided, and the danger due to an excessive output torque force of the motor module 110 may be avoided as well. Besides, once the external force or the obstacle is removed, the actual speed RS of the motor module 110 may be gradually increased and maintained at the set speed SS or on the speed curve SCU, so as to move based on the set speed SS or the speed curve SCU.

Figure 8:
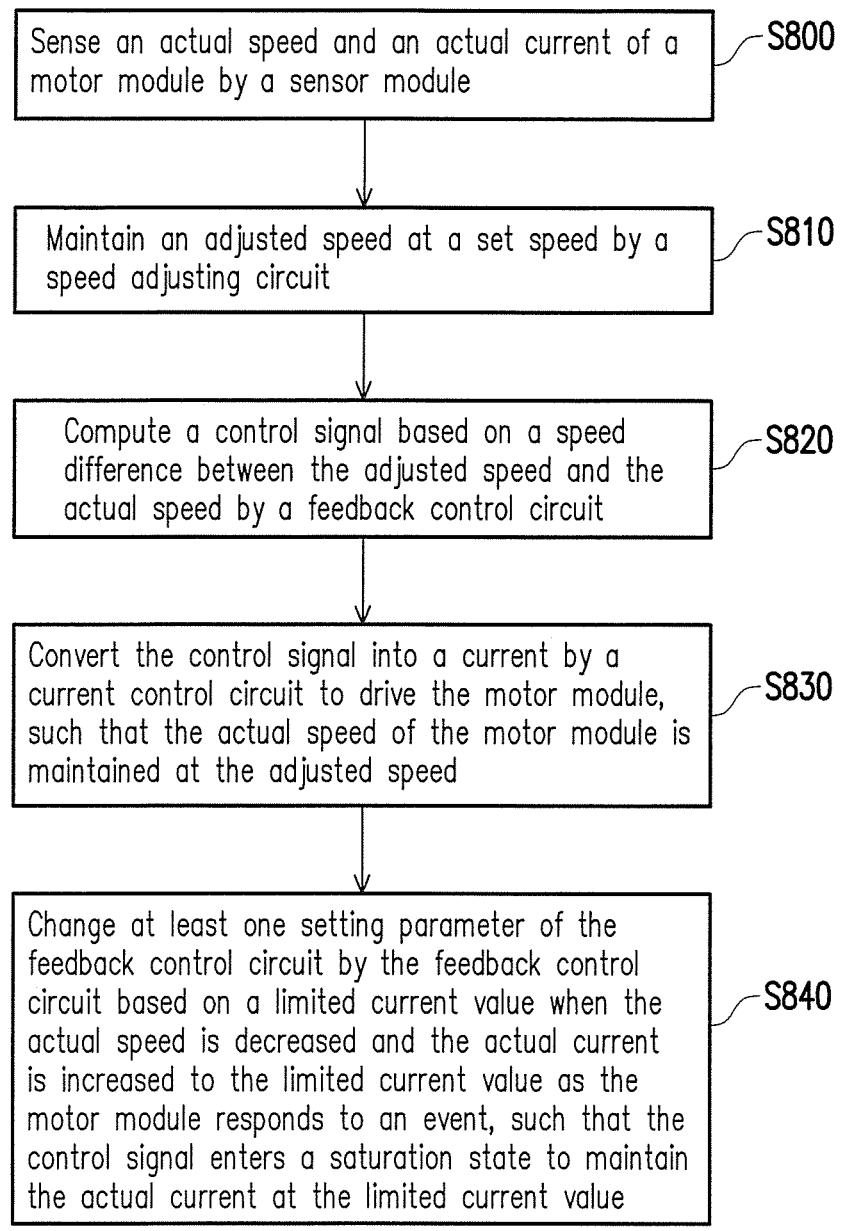
FIG. 8 is a flowchart illustrating a motor control method according to yet another embodiment of the disclosure.

The embodiment above describes an example where the angle, speed, and current of the motor module 110 are controlled together. However, the disclosure is not limited thereto. In yet another embodiment of the disclosure, only the speed and current of the motor apparatus 100 are controlled. Referring to FIGS. 1 and 8, FIG. 8 is a flowchart illustrating a motor control method according to yet another embodiment of the disclosure. According to the motor control method of FIG. 8, the speed and the current of the motor apparatus 100 of FIG. 1 are controlled together.

First of all, at Step S800, the actual speed RS and the actual current RC of the motor module 110 are sensed by the sensor module 120. Then, at Step S810, the adjusted speed ADJ_S may be maintained at the set speed SS by the speed adjusting circuit 140 (processing circuit 10). Then, at Step S820, the feedback control circuit 150 (the processing circuit 10) may compute the control signal CTR based on the speed difference between the adjusted speed ADJ_S and the actual speed RS. Then, at Step S830, the control signal CTR may be converted into a current by the current control circuit 160 (the processing circuit 10) to drive the motor module 110, thereby maintaining the actual speed RS of the motor module 110 at the adjusted speed ADJ_S. Then, at Step S840, when the actual speed RS is decreased and the actual current RC is increased to the limited current value SC as the motor module 110 responds to an event, at least one setting parameter of the feedback control circuit 150 may be changed by the feedback control circuit 150 based on the limited current value SC, such that the control signal CTR enters the saturation state to maintain the actual current RC at the limited current value SC.

In the control method shown in FIG. 8, Step S810, Step S820, Step S830, and Step S840 are respectively similar to Step S620, Step S640, Step S650, and Step S660. Thus, details of these steps may be referred to relevant descriptions in FIGS. 6 to 7 and will not be repeated in the following. It should be noted that, in the control method shown in FIG. 8, the angle of the motor apparatus 100 is not controlled. Thus, Step S610 shown in FIG. 6 (i.e., the step of obtaining the speed curve SCU) may be omitted. In this way, the speed computation circuit 130 shown in FIG. 1 may be omitted, the adjusted speed ADJ_S may be maintained at the set speed SS at Step S810. Here, the set speed SS may be a speed command input by the user. However, the disclosure is not limited thereto. Besides, in the control method shown in FIG. 8, Step S630 of FIG. 6 is omitted. Namely, the step of making the adjusted speed ADJ_S follow the actual speed RS is omitted. However, the disclosure is not limited thereto. In other embodiments of the disclosure, the control method shown in FIG. 8 may also include Step S630 shown in FIG. 6 (i.e., the step of making the adjusted speed ADJ_S follow the actual speed RS).

In view of the foregoing, in the motor apparatus and the motor control method according to the embodiments of the disclosure, at least two of the position (angle), speed, and current (torque force) of the motor module are able to be controlled together. In this way, when the motor apparatus is applied with an external force or encounters an obstacle (e.g., the motor hits a human being), the current (torque force) of the motor module may be prevented from being excessively high, which causes damages or danger, so as to ensure the safety of the motor apparatus in use. Once the external force or the obstacle is removed, the actual speed of the motor module may return to the set speed or the speed curve, so as to perform an operation set by the user.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A motor control method, comprising:
   sensing an actual speed and an actual angle of a motor module by a sensor module;
   computing a speed curve based on the actual angle, a set angle, and a set speed by a speed computation circuit, wherein the set angle and the set speed are input by a user;

maintaining an adjusted speed on the speed curve by a speed adjusting circuit;

determining whether to change the adjusted speed by the speed adjusting circuit when the actual speed is changed as the motor module responds to an event, such that the adjusted speed follows the actual speed;

computing a control signal based on a speed difference between the adjusted speed and the actual speed by a feedback control circuit; and converting the control signal into a current by a current control circuit to drive the motor module, thereby maintaining the actual speed at the adjusted speed, wherein when the event ends, the adjusted speed and the actual speed are again maintained on the speed curve by the speed adjusting circuit.

2. The motor control method as claimed in claim 1, wherein the set speed comprises an acceleration and a speed limitation adapted to set the motor module, wherein the speed curve is a trapezoidal curve on a coordinate system, a maximum speed of the speed curve is the speed limitation, a rising slope or a descending slope of the speed curve is the acceleration, and an area surrounded by the speed curve and the coordinate system is the set angle.

3. The motor control method as claimed in claim 2, wherein the step of maintaining the adjusted speed on the speed curve by the speed adjusting circuit comprises:

gradually increasing or decreasing the adjusted speed based on the acceleration, such that the adjusted speed approaches and is maintained on the speed curve.

4. The motor control method as claimed in claim 1, wherein the step of determining whether to change the adjusted speed by the speed adjusting circuit when the actual speed is changed as the motor module responds to the event, such that the adjusted speed follows the actual speed, comprises:

comparing the adjusted speed and the actual speed to obtain a speed error when the actual speed is changed as the motor module responds to the event;

determining whether the speed error is greater than a set error;

if the speed error is greater than the set error, performing an addition operation or a subtraction operation to the actual speed and the set error to obtain an updated speed, and using the updated speed as the adjusted speed; and if the speed error is not greater than the set error, not changing the adjusted speed.

5. The motor control method as claimed in claim 4, wherein when the actual speed is reduced to zero as the motor module responds to the event, the adjusted speed is maintained at the set error, and the set error is not zero.

6. The motor control method as claimed in claim 1, further comprising:

sensing an actual current of the motor module by the sensor module;

changing at least one setting parameter of the feedback control circuit by the feedback control circuit based on a limited current value when the actual speed is decreased and the actual current is increased to the limited current value as the motor module responds to the event, such that the control signal enters a saturation state to maintain the actual current at the limited current value.

7. The motor control method as claimed in claim 6, wherein the feedback control circuit serves as a proportion-integration-differentiation (PID) controller, and the at least one setting parameter comprises a proportion gain parameter, an integration gain parameter, and a differentiation gain parameter.

8. The motor control method as claimed in claim 6, further comprising:

changing the at least one setting parameter by the feedback control circuit after the event ends, such that the actual current is decreased, and the actual speed is increased and maintained at the adjusted speed.

9. The motor control method as claimed in claim 6, further comprising:

changing the adjusted speed by the speed adjusting circuit to follow the actual speed when the control signal enters the saturation state to maintain the actual current at the limited current value, such that the control signal exits the saturation state to decrease the actual current.

10. A motor control method, comprising:

sensing an actual speed and an actual current of a motor module by a sensor module;

maintaining an adjusted speed at a set speed or on a speed curve by a speed adjusting circuit;

computing a control signal based on a speed difference between the adjusted speed and the actual speed by a feedback control circuit;

converting the control signal into a current by a current control circuit to drive the motor module, thereby maintaining the actual speed at the adjusted speed; and changing at least one setting parameter of the feedback control circuit by the feedback control circuit based on a limited current value when the actual speed is decreased and the actual current is increased to the limited current value as the motor module responds to an event, such that the control signal enters a saturation state to maintain the actual current at the limited current value.

11. The motor control method as claimed in claim 10, wherein the feedback control circuit serves as a proportion-integration-differentiation (PID) controller, and the at least one setting parameter comprises a proportion gain parameter, an integration gain parameter, and a differentiation gain parameter.

12. The motor control method as claimed in claim 10, further comprising:

changing the at least one setting parameter by the feedback control circuit after the event ends, such that the actual current is decreased, and the actual speed is increased and maintained at the adjusted speed.

13. The motor control method as claimed in claim 10, further comprising:

changing the adjusted speed by the speed adjusting circuit to follow the actual speed when the control signal enters the saturation state to maintain the actual current at the limited current value, such that the control signal exits the saturation state to decrease the actual current.

14. A motor apparatus, comprising:

a motor module;

a sensor module, configured to sense an actual speed and an actual angle of the motor module;

a speed computation circuit, coupled to the sensor module and configured to compute a speed curve based on the actual angle, a set angle, and a set speed, wherein the set angle and the set speed are input by a user;

a speed adjusting circuit, coupled to the speed computation circuit to receive the speed curve, and configured to maintain an adjusted speed on the speed curve;

a feedback control circuit, coupled to the speed adjusting circuit and the sensor module, and configured to generate a control signal based on a speed difference between the adjusted speed and the actual speed; and a current control circuit, coupled to the feedback control circuit and the motor module, and configured to convert the control signal into a current to drive the motor module, such that the actual speed is maintained at the adjusted speed, wherein when the actual speed is changed as the motor module responds to an event, the speed adjusting circuit determines whether to change the adjusted speed, such that the adjusted speed follows the actual speed, and when the event ends, the speed adjusting circuit again maintains the adjusted speed and the actual speed on the speed curve.

15. The motor apparatus as claimed in claim 14, wherein the set speed comprises an acceleration and a speed limitation adapted to set the motor module, wherein the speed curve is a trapezoidal curve on a coordinate system, a maximum speed of the speed curve is the speed limitation, a rising slope or a descending slope of the speed curve is the acceleration, and an area surrounded by the speed curve and the coordinate system is the set angle.

16. The motor apparatus as claimed in claim 15, wherein the speed adjusting circuit gradually increases or decreases the adjusted speed based on the acceleration, such that the adjusted speed approaches and is maintained on the speed curve.

17. The motor apparatus as claimed in claim 14, wherein:
when the actual speed is changed as the motor module responds to the event, the speed adjusting circuit compares the adjusted speed and the actual speed to obtain a speed error; and
the speed adjusting circuit determines whether the speed error is greater than a set error, an addition operation or a subtraction operation is performed to the actual speed and the set error to obtain an updated speed and the updated speed is served as the adjusted speed if the speed error is greater than the set error, and the adjusted speed is not changed if the speed error is not greater than the set error.

18. The motor apparatus as claimed in claim 14, wherein:
the sensor module is further configured to sense an actual current of the motor module,
when the actual speed is decreased and the actual current is increased to a limited current value as the motor module responds to the event, the feedback control circuit changes at least one setting parameter of the feedback control circuit based on the limited current value, such that the control signal enters a saturation state to maintain the actual current at the limited current value.

19. A motor apparatus, comprising:
a motor module;
a sensor module, configured to sense an actual speed and an actual current of the motor module;
a speed adjusting circuit, configured to maintain an adjusted speed at a set speed or on a speed curve;
a feedback control circuit, coupled to the speed adjusting circuit and the sensor module, and configured to generate a control signal based on a speed difference between the adjusted speed and the actual speed; and
a current control circuit, coupled to the feedback control circuit and the motor module, and configured to convert the control signal into a current to drive the motor module, such that the actual speed is maintained at the adjusted speed,
wherein when the actual speed is decreased and the actual current is increased to a limited current value as the motor module responds to an event, the feedback control circuit changes at least one setting parameter of the feedback control circuit based on the limited current value, such that the control signal enters a saturation state to maintain the actual current at the limited current value.

20. The motor apparatus as claimed in claim 19, wherein the feedback control circuit serves as a proportion-integration-differentiation (PID) controller, and the at least one setting parameter comprises a proportion gain parameter, an integration gain parameter, and a differentiation gain parameter.

21. The motor apparatus as claimed in claim 19, wherein the feedback control circuit changes the at least one setting parameter when the event ends, such that the actual current is decreased, and the actual speed is increased and maintained at the adjusted speed.

22. The motor apparatus as claimed in claim 19, wherein when the control signal enters the saturation state to maintain the actual current at the limited current value, the speed adjusting circuit changes the adjusted speed to follow the actual speed, such that the control signal exits the saturation state to decrease the actual current.

* * * * *